(12) United States Patent
Hosoi et al.

(10) Patent No.: US 12,344,777 B2
(45) Date of Patent: Jul. 1, 2025

(54) ADHESIVE TAPE

(71) Applicant: TERAOKA SEISAKUSHO CO., LTD., Tokyo (JP)

(72) Inventors: Mikio Hosoi, Tokyo (JP); Sou Himori, Tokyo (JP)

(73) Assignee: TERAOKA SEISAKUSHO CO., LTD., Tokyo (JP)

( * ) Notice: Subject to any disclaimer, the term of this patent is extended or adjusted under 35 U.S.C. 154(b) by 89 days.

(21) Appl. No.: 17/922,559

(22) PCT Filed: Apr. 27, 2021

(86) PCT No.: PCT/JP2021/016842
§ 371 (c)(1),
(2) Date: Oct. 31, 2022

(87) PCT Pub. No.: WO2021/221070
PCT Pub. Date: Nov. 4, 2021

(65) Prior Publication Data
US 2023/0174824 A1 Jun. 8, 2023

(30) Foreign Application Priority Data

May 1, 2020 (JP) .................................. 2020-081134

(51) Int. Cl.
*C09J 7/21* (2018.01)
*C09J 7/50* (2018.01)

(52) U.S. Cl.
CPC . *C09J 7/21* (2018.01); *C09J 7/50* (2018.01); *C09J 2301/122* (2020.08);
(Continued)

(58) Field of Classification Search
None
See application file for complete search history.

(56) References Cited

U.S. PATENT DOCUMENTS

2009/0145542 A1* 6/2009 Zoller ................. B29C 65/5021
428/41.3
2012/0190260 A1* 7/2012 Morishita ................ D04B 1/18
442/301

FOREIGN PATENT DOCUMENTS

EP         4 309 891 A1    1/2024
JP       H07-247466 A      9/1995
(Continued)

OTHER PUBLICATIONS

Machine English translation of KR101196866, Accessed Jun. 10, 2024 (Year: 2012).*
Machine English translation of WO2009072411, Accessed Jun. 10, 2024 (Year: 2009).*
International Searching Authority, "International Search Report," issued in connection with International Patent Application No. PCT/JP2021/016842, dated Jul. 13, 2021.
(Continued)

*Primary Examiner* — Jacob T Minskey
*Assistant Examiner* — Adrianna N Konves
(74) *Attorney, Agent, or Firm* — Foley & Lardner LLP

(57) ABSTRACT

The adhesive tape, in which delamination hardly occurs even when a laminate layer is thin, includes: a base material 1 of a warp-knitted fabric in which a weft yarn 11 is inserted into a loop structure formed by a multifilament warp yarn 12; a first laminate layer 2 formed on a first surface 1A of the base material 1 where one warp yarn appears on the surface of the weft yarn; a second laminate layer 3 formed on a second surface 1B of the base material 1 on which two warp yarns appear on said weft yarn surface; and an adhesive layer 6 formed on the side of the first laminate layer 2.

19 Claims, 3 Drawing Sheets

(52) U.S. Cl.
CPC ........ *C09J 2301/16* (2020.08); *C09J 2423/04* (2013.01); *C09J 2467/00* (2013.01)

(56) References Cited

FOREIGN PATENT DOCUMENTS

| | | | |
|---|---|---|---|
| JP | H11-335942 A | 12/1999 | |
| JP | 2000-314062 A | 11/2000 | |
| JP | 2002-294189 A | 10/2002 | |
| JP | 2003-253543 A | 9/2003 | |
| JP | 2009-138031 A | 6/2009 | |
| JP | 2012-017415 A | 1/2012 | |
| JP | 2012-036516 A | 2/2012 | |
| JP | 2014-210998 A | 11/2014 | |
| KR | 20120041501 A * | 11/2012 | |
| WO | WO-2009072411 A1 * | 6/2009 | ............. B32B 27/02 |

OTHER PUBLICATIONS

International Searching Authority, "Written Opinion," issued in connection with International Patent Application No. PCT/JP2021/016842, dated Jul. 13, 2021.

Guo et al., "Adhesion of Aluminum Alloy Structures", National Defense Industry Press, First Edition: May 1993, Second Printing: Mar. 1996, pp. 21-22.

Office Action issued in corresponding Chinese Patent Application No. 202180030916.X dated Aug. 31, 2024.

European Extended Search Report issued in corresponding European Patent Application No. 21795806.5 dated Apr. 25, 2024 (7 pages).

* cited by examiner

[FIG. 2]
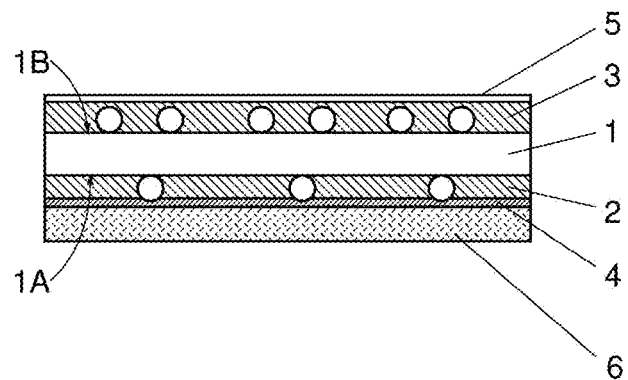
[FIG. 3]
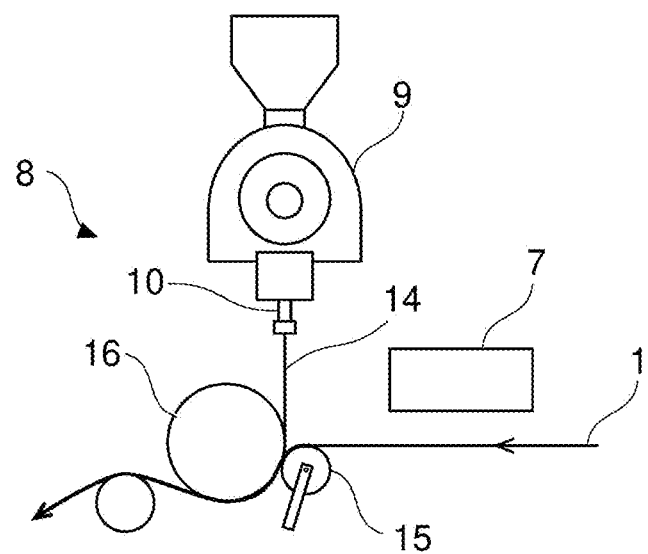

ADHESIVE TAPE

CROSS-REFERENCE TO RELATED APPLICATIONS

The present application claims priority under 37 U.S.C. § 371 to International Patent Application No. PCT/JP2021/016842, filed Apr. 27, 2021, which claims priority to and the benefit of Japanese Patent Application No. 2020-081134, filed on May 1, 2020. The contents of these applications are hereby incorporated by reference in their entireties.

TECHNICAL FIELD

This invention relates to an adhesive tape that is suitably used as packaging and curing materials.

BACKGROUND ART

High-adhesion adhesive tapes have been widely used for fixing and binding materials in a wide range of fields, such as agriculture, civil engineering, construction, and transportation, as well as for masking painted surfaces. In addition, such adhesive tapes are required to have adequate base material strength and hand-cutability for work convenience.

Adhesive tapes with improved hand-cutability are disclosed in Patent Document 1.

In the patent document 1, a chemical or physical anchor treatment layer is formed on one or both sides of a knitted fabric formed by inserting a flat yarn made mainly of thermoplastic resin as a weft yarn into a warp yarn made of independently knitted multi-filaments, and the thermoplastic resin is melted or laminated on the anchor treatment layer. The adhesive tape is an adhesive tape in which a pressure-sensitive adhesive is applied to one or both sides of a knitted fabric base material, which is laminated on one or both sides in a dry film state, and the warp and woof direction tensile strength, warp and woof direction tear strength, and warp direction elongation are specified at specific values.

PRIOR ART DOCUMENT

Patent Literature

Patent Document 1: JP 2002-294189A

SUMMARY OF THE INVENTION

Problems to be Solved by the Invention

Conventional adhesive tapes generally have a structure in which a surface of a base fabric as described above is covered with a laminated layer of thermoplastic resin, and an adhesive layer is formed via an undercoating layer.

When the adhesive tape is attached to the adherend and then pulled off, the adhesive may remain on the adherend (this phenomenon is hereinafter referred to as "adhesive residue"), or even the laminate layer may peel off and remain on the adherend together with the adhesive. The phenomenon of the laminate layer peeling off is called "lamination peeling". In the case of adhesive residue, it can be removed by wiping with alcohol, etc. However, in the case of lamination peeling, the adhesive is covered by the laminate layer residue, and it may be difficult to wipe off with alcohol, etc.

To prevent such lamination peeling, measures such as thickening the laminate layer have been taken, but thickening the laminate layer increases the roll diameter and tape weight for the same tape length, and also increases the cost.

Therefore, an object of the present invention is to provide an adhesive tape that is resistant to lamination peeling even when the laminate layer is made thinner.

Means for Dissolving the Problem

The inventors have found that by specifying the structure of the side where the adhesive layer is formed in the base cloth, an adhesive tape that is difficult to laminate can be obtained.

That is, the invention relates to an adhesive tape comprises:

a base material of a warp-knitted fabric in which a weft yarn is inserted into a loop structure formed by a multifilament warp yarn;

a first laminate layer formed on a first surface of the base material where one warp yarn appears on the surface of the weft yarn;

a second laminate layer formed on a second surface of the base material on which two warp yarns appear on said weft yarn surface; and an adhesive layer formed on the side of the first laminate layer.

Effect of the Invention

In the present invention, the first surface of the warp knitted fabric on forming the first laminate layer has relatively fewer warp yarns appearing on the surface of the weft yarns. According to this constitution, an adhesion area between the weft yarns and the laminate layer increases, thereby suppressing lamination peeling.

BRIEF DESCRIPTION OF THE DRAWINGS

FIG. 2 is a schematic cross-sectional view showing a cross-sectional structure of an adhesive sheet according to one embodiment of the present invention.

FIG. 3 is a view for explaining a manufacturing process of the adhesive sheet according to one embodiment of the present invention.

EMBODIMENTS FOR CARRYING OUT THE INVENTION

The adhesive tape according to one embodiment of the present invention comprises: a base material of a warp-knitted fabric in which a weft yarn is inserted into a loop structure formed by a multifilament warp yarn; a first laminate layer formed on a first surface of the base material where one warp yarn appears on the surface of the weft yarn; a second laminate layer formed on a second surface of the base material on which two warp yarns appear on said weft yarn surface; and an adhesive layer formed on the side of the first laminate layer.

Hereinafter, each configuration will be described.

Base Material (Warp Knitted Fabric)

Figure 1A:
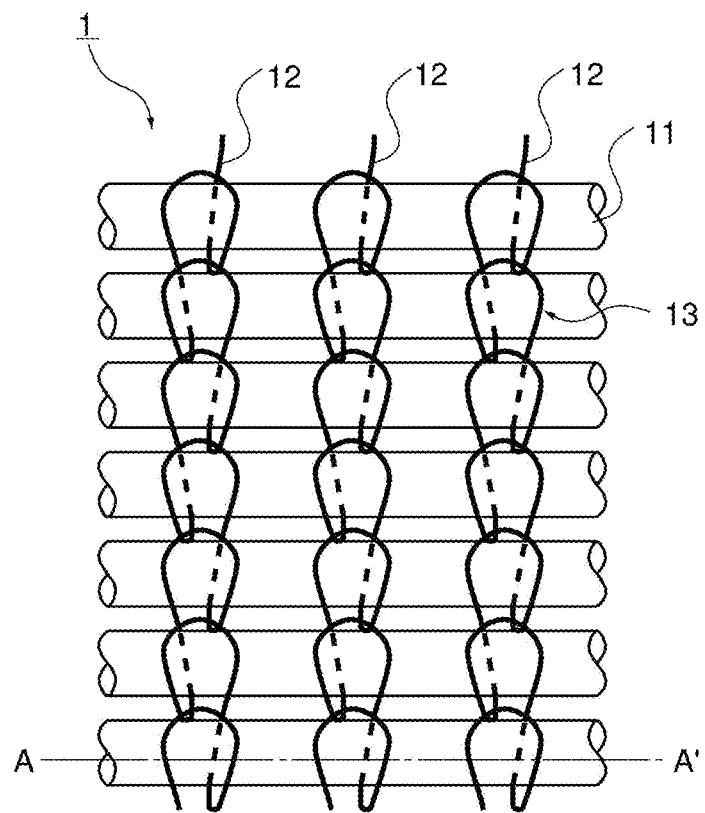
FIG. 1(a) is a plan view schematically showing a knitted fabric used in one embodiment of the present invention.
Figure 1B:
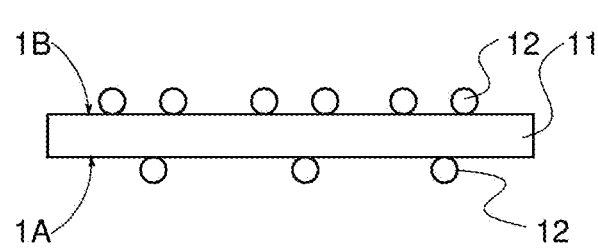
FIG. 1(b) is a schematic cross-sectional view taken along line A-A'.

The adhesive tape according to one embodiment of the present invention uses, as a base material, a warp knitted fabric in which a weft is inserted into a loop structure formed by warp yarns of multifilament. FIG. 1(a) is a plan view schematically showing a knitted fabric 1 used in one embodiment of the present invention, FIG. 1(b) is a schematic cross-sectional view taken along line A-A', and an independent chain stitch 13 is formed by a multi-filament warp yarn 12, and a weft yarn 11 is inserted into the independent chain stitch 13. As shown in the schematic cross-sectional view FIG. 1(b), in each independent chain stitch 13, a surface on which one warp 12 is formed is referred to as a first surface 1A, and a surface on which two warps 12 are formed is referred to as a second surface 1B.

FIGS. 1(a) and 1(b) show an independent chain-knit structure with warp yarns connected in the longitudinal direction (up and down direction on the paper) as a loop structure with warp yarns, but it is not limited to this structure, for example, a Denbigh stitch structure as shown in JP 2014-210998A. Other known loop structures may be used as well. In any cases, this loop structure formed by the warp yarns should be formed in such a way that one warp yarn appears on one side and two warp yarns appear on the other side in each loop structure.

(Warp Yarn)

Warp yarns can be made of any material used in the field, including polyolefin resins such as polyethylene and polypropylene, polyester resins such as polyethylene terephthalate (PET), polyacrylic resins, and polyamide resins such as nylon. Multi-filaments made of these resins are used as warp yarn. The fineness of the multi-filaments is 10 to 1000-denier (1.11 to 111-tex), preferably 20 to 500-denier (2.22 to 55.5-tex) from the view point of a good balance in a strength of the base material, hand cuttability, and elongation. The placing number of warp yarns can be 10 to 40 yarns per inch.

(Weft Yarn)

The weft yarn is not limited to materials used in the field, and the same thermoplastic resins as the warp yarn above can be used. It is preferable to use a flat yarn made from films of these thermoplastic resins melt-extruded from a T-die or circular die and processed into narrow widths. Modifiers such as anti-aging agents and antistatic agents may be added as needed. The fineness of the multi-filaments is 50 to 1000-denier (5.55 to 111-tex), preferably 100 to 500-denier (11.1 to 55.5-tex) from the view point of a good balance between the vertical hand cutting ability and the thermal degradation during lamination. The placing number of weft yarns can be 8 to 28 yarns per inch.

Adhesive Tape

FIG. 2 shows a cross-sectional view of an adhesive tape with an adhesive layer 6 on one side, in which a first laminate layer 2 on a first surface 1A of the warp knitted fabric 1 and a second laminate layer 3 is formed on a second surface 1B, and the adhesive layer 6 is provided on the side of the first laminate layer 2. Here, an undercoating layer 4 is provided between the first laminate layer 2 and the adhesive layer 6, and a backside agent layer 5 on the surface of the second laminate layer 3 at the opposite side of the adhesive layer 6 is shown, but these layers can be arbitrary. When the tape is formed by rolling it into a roll, the surface in contact with the adhesive layer 6 may be rolled through a release paper or release film, or a release layer may be formed as the backside agent layer 5.

(Laminated Layer)

For the laminate layer, it is preferable to use the same type of resin material as the weft yarn to prevent lamination peeling. The amount of coating per side can be selected from 50 to 250 g/m² according to the purpose. The thickness can be selected from 5 to 300 µm. In the present invention, lamination peeling is less likely to occur even if the laminate layers, especially the first laminate layer, which is prone to lamination peeling, are formed thin.

A method of forming this laminate layer is described using FIGS. 3 and 4.

Figure 4A:
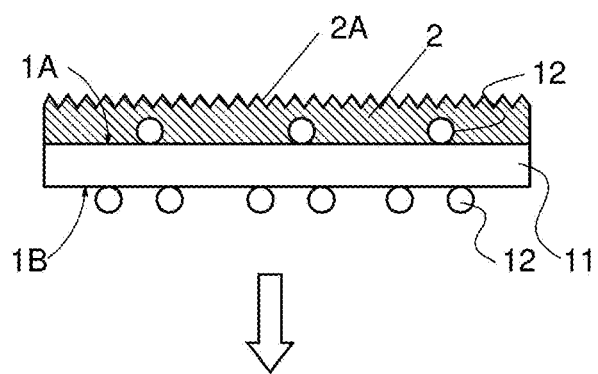
FIGS. 4(a) and 4(b) are a process cross-sectional view for explaining the manufacturing process of the adhesive sheet according to one embodiment of the present invention.

First, a physical or chemical surface treatment (anchor treatment) is applied to the first surface 1A of the warp knitted fabric 1, which serves as the base material. The physical treatment includes corona treatment, UV treatment, sputtering treatment, etc., and the chemical treatment includes applying a resin selected from organotitanium, isocyanate, polyethyleneimine, polybutadiene, etc. FIG. 3 shows the treatment with a corona treatment device 7. Next, an extrusion laminator 8 is used to apply a resin material 14 from an extruder 9 to the first surface 1A of the warp knitting fabric 1 through the T-die 10. The resin material 14 is bonded to the warp knitting fabric 1 by a rubber-made press roll 15, while being pressed against a cooling roll 16 together with the warp knitted fabric 1. Hear, when bonding the resin material 14 to the first surface 1A, a so-called mat roll in which its surface is processed with an uneven treatment can be used as the cooling roll 16, so that the first laminate layer 2 with a mat surface 2A as shown in FIG. 4(a) is formed on the first surface 1A.

Figure 4B:
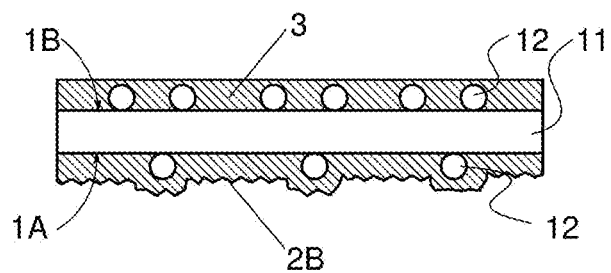

Next, the front and back are reversed, and the second surface 1B of the warp knitted fabric 1 is subjected to the surface treatment and the lamination of the resin material 14 in the same manner as the first surface 1A. By using a so-called mirror roll with a mirror-finished surface as the cooling roll 16 in this case, the second laminated layer 3 with a smooth surface is formed as shown in FIG. 4(b).

Here, when the second surface 1B of the warp knitted fabric 1 is pressed against the mirror roll by the rubber press roll 15, the mat surface 2A in contact with the press roll 15 becomes the first laminate layer 2 with an uneven surface 2B reflecting the unevenness of the warp yarns.

This uneven surface of the first laminate layer increases the contact area when forming the adhesive layer 6 and effectively suppresses adhesive residue.

(Undercoating Layer)

On the surface of the first laminate layer formed as described above, an undercoating layer can be formed to improve adhesion with the adhesive layer. Undercoating agents include application of various elastomers (e.g., copolymer of ethylene and vinyl acetate, chlorinated polypropylene, reaction product of styrene-butadiene copolymer and phenol resin, butyl acrylate, vinyl acetate, acrylamide, reaction product of natural rubber or synthetic rubber), application of various primer, and the like. In addition, the surface of the first laminate layer may be modified by corona treatment, etching treatment, plasma treatment, sandblast treatment, etc., instead of forming the undercoating layer.

(Adhesive Layer)

As an adhesive, an appropriate selection from known adhesive compositions should be used to achieve the desired adhesive strength. The adhesive layer includes a base polymer as an adhesive component (called adhesive base polymer). The adhesive base polymer is not particularly limited, but an acrylic adhesive or a rubber-based adhesive can be used. The aforementioned acrylic adhesives include, for example, acrylic adhesives obtained by using (meth)acrylic ester monomers, as a main component, such as methyl (meth)acrylate, ethyl (meth)acrylate, isopropyl (meth)acrylate, n-butyl (meth)acrylate, 2-ethylhexyl (meth)acrylate, isooctyl (meth)acrylate, nonyl (meth)acrylate, isononyl (meth)acrylate, and if necessary by copolymerizing with a monomer containing functional groups such as (meth) acrylic acid, crotonic acid, fumaric acid, itaconic acid, maleic acid (anhydride), or vinyl acetate, acrylonitrile, styrene, 2-hydroxyethyl acrylate, 2-methylol ethyl acrylamide and others.

Rubber-based adhesives include rubber-based adhesives obtained from one or a combination of two or more elastomer components such as natural rubber, styrene-butadiene rubber, butyl rubber, isoprene rubber, butadiene rubber, styrene- and isoprene block copolymers by mixing with rosin-based resins, terpene-based resins, aliphatic petroleum resins, aromatic petroleum resins, copolymerized petroleum resins, alicyclic petroleum resins, coumarone-indene resins, pure monomer resins, phenolic resins, xylene resins, and the like.

In addition to the adhesive base polymer, the adhesive layer can contain various additives known in the field. Such additives can include one or a combination of two or more of various additives such as cross-linking agents, flame retardants, antioxidants, weathering agents, softeners, stabilizers, fillers, bulking agents, and reinforcing agents.

The thickness of the adhesive layer can be set according to the purpose and each component of the adhesive used, but for example, it can be formed in the range of 5 to 200 μm. The adhesive layer is formed by coating directly on the first laminate layer or after forming the above undercoating layer or subjecting surface treatment, using various coating devices. The coating devices include, for example, roll coater, die coater, lip coater, Myer bar coater, gravure coater.

(Backside Treatment)

When the tape is wound around as a roll, the surface of the second laminate layer that contacts the adhesive layer is coated with various release agents as a backside treatment. The release agents include long-chain alkyl release agents (copolymers of stearyl acrylate with acrylic acid, vinyl acetate or acrylonitrile, copolymers of stearyl acrylamide with acrylonitrile or acrylic acid, copolymers of stearyl vinyl-ether with acrylic acid, maleic anhydride, or copolymers of stearyl acrylamide and acrylonitrile or acrylic acid), and silicone release agents of addition reaction type, condensation reaction type, cationic polymerization type, radical polymerization type, and others.

These release agents can also be applied and formed by the various coating devices mentioned above.

EXAMPLES

The invention will be described more specifically in the following examples. The invention is not limited in any way by these examples.

Example 1

The base material was knitted into a warp knit fabric by using 30-denier (3.3-tex) polyester multi-filaments as the warp yarn and a 300-denier (33-tex) high density polyethylene flat yarns as the weft yarn to form an independent chain-knit structure, as shown in FIGS. 1(a) and 1(b).

Next, a resin layer was formed on both the front and back sides of the knitted base material to make a laminated tape. Polyethylene resin was used for the resin layer. First, transparent polyethylene resin was melted and extruded from a T-die onto the first surface 1A of the base material, which was stretched between two rubber rolls, and pressurized by a mat roll. Next, after reversing the front and back sides, a polyethylene resin layer extruded from a T-die was laminated on the second surface 1B in the same manner. The second surface was pressurized by pressing a mirror roll against it.

In the following description, the side where the adhesive layer is formed is the first layer and the opposite side is the second layer.

The thickness of the first layer (the first laminate layer of the invention) is 30 μm, and the thickness of the second layer (the second laminate layer of the invention) is 33 μm in thickness.

Next, after forming an undercoating layer of ethylene-vinyl acetate copolymer on the first layer side, was then coated with acrylic adhesive using a roll coater to form an adhesive layer of Example 1 having 35 μm thick. The tape constitution is shown in Table 1.

Comparative Example 1

An adhesive tape of Comparative Example 1 was produced in the same manner as Example 1, except that laminate layers were formed as the first layer on the second surface of the base material and the second layer on the first surface. The tape constitution is shown in Table 1.

Comparative Example 2

Adhesive tape was produced in the same way as in Comparative Example 1, except that the thickness of the laminate layer was changed as shown in Table 1.

TABLE 1

| <Tape constitution> | | | |
|---|---|---|---|
| | Example 1 | Comparative Example 1 | Comparative Example 2 |
| Adhesive layer | The side of one yarn | The side of two yarns | The side of two yarns |
| Thickness of the laminate layer (μm) 1st layer/2nd layer | 30/33 | 30/33 | 37/40 |

Next, the resulting adhesive tape was evaluated for lamination peeling. The evaluation method was conducted in accordance with the adhesive strength measurement test of JIS Z 0237. The evaluation criteria are as follows. The results are shown in Table 2.

◯: Not occurring lamination peeling
Δ: Less than 5% lamination peeling occurred
X: 5% to less than 30% lamination peeling occurred
XX: 30% to less than 80% lamination peeling occurred
XXX: 80% or more lamination peeling occurred

TABLE 2

| Curing Temp. × period | Temperature at peeling | Adherend | Example 1 | Comparative Example 1 | Comparative Example 2 |
|---|---|---|---|---|---|
| 20° C. × 24 h | 23° C. | SUS | ◯ | XXX | ◯ |
| 20° C. × 24 h | 5° C. | SUS | Δ | XXX | Δ |
| | | Alumite | ◯ | X | Δ |
| | | Glass | ◯ | XXX | ◯ |
| 65° C. × 72 h | 23° C. | SUS | ◯ | XXX | ◯ |

As shown in Example 1, in the adhesive tape of the present invention, in which the first laminate layer was formed on the first surface of the base material and the adhesive layer was formed thereon, lamination peeling was effectively suppressed even when the first laminate layer was thin. In Comparative Example 1, where a thin laminate layer was formed on the second surface of the base material, lamination peeling was observed more frequently. Therefore, it is necessary to form a thicker laminate layer as in Comparative Example 2.

DESCRIPTION OF THE REFERENCE NUMERALS

1. Warp Knitted Fabric
   11. Weft Yarn
   12. Warp Yarn
   13. Independent Chain Stitch
   1A First Surface
   1B Second Surface
2. First Laminate Layer
3. Second Laminate Layer
4. Undercoating Layer
5. Backside Agent Layer
6. Adhesive Layer
7. Corona Treatment Device
8. Extrusion Laminator
9. Extruder
10. T-die
14. Resin Material
15. Press Roll (Rubber-made)
16. Cooling Roll

The invention claimed is:

1. An adhesive tape comprises:
   a base material of a warp-knitted fabric in which a weft yarn is inserted into a loop structure formed by a multifilament warp yarn;
   a first laminate layer formed on a first surface of the base material where one warp yarn appears on the surface of the weft yarn;
   a second laminate layer formed on a second surface of the base material on which two warp yarns appear on said weft yarn surface; and
   an adhesive layer formed on the side of the first laminate layer.

2. The adhesive tape according to claim 1, wherein the loop structure is an independent chain stitch.

3. The adhesive tape according to claim 1, wherein the weft yarn is a flat yarn.

4. The adhesive tape according to claim 3, wherein the flat yarn is made of polyethylene.

5. The adhesive tape according to claim 4, wherein the first laminate layer and the second laminate layer comprise polyethylene.

6. The adhesive tape according to claim 1, wherein the warp yarn is a polyester multifilament.

7. The adhesive tape according to claim 1, further comprising an undercoating layer between the adhesive layer and the first laminate layer.

8. The adhesive tape according to claim 1, further comprising a backside agent layer on the surface of the second laminate layer and the adhesive tape is held in roll form so that the backside agent layer is on the outside.

9. The adhesive tape according to claim 2, wherein the weft yarn is a flat yarn.

10. The adhesive tape according to claim 9, wherein the flat yarn is made of polyethylene.

11. The adhesive tape according to claim 10, wherein the first laminate layer and the second laminate layer comprise polyethylene.

12. The adhesive tape according to claim 2, wherein the warp yarn is a polyester multifilament.

13. The adhesive tape according to claim 2, further comprising an undercoating layer between the adhesive layer and the first laminate layer.

14. The adhesive tape according to claim 2, further comprising a backside agent layer on the surface of the second laminate layer and the adhesive tape is held in roll form so that the backside agent layer is on the outside.

15. The adhesive tape according to claim 3, wherein the warp yarn is a polyester multifilament.

16. The adhesive tape according to claim 3, further comprising an undercoating layer between the adhesive layer and the first laminate layer.

17. The adhesive tape according to claim 3, further comprising a backside agent layer on the surface of the second laminate layer and the adhesive tape is held in roll form so that the backside agent layer is on the outside.

18. The adhesive tape according to claim 17, wherein the flat yarn is made of polyethylene.

19. The adhesive tape according to claim 18, wherein the first laminate layer and the second laminate layer comprise polyethylene.

* * * * *